United States Patent
Chaney et al.

Patent Number: 5,615,700
Date of Patent: *Apr. 1, 1997

[54] DOUBLE CONTAINMENT FITTING

[75] Inventors: David A. Chaney; Mark Wallen, both of Tulsa, Okla.

[73] Assignee: Conley Corporation, Tulsa, Okla.

[*] Notice: The term of this patent shall not extend beyond the expiration date of Pat. No. 5,546,977.

[21] Appl. No.: 626,022

[22] Filed: Apr. 1, 1996

Related U.S. Application Data

[63] Continuation-in-part of Ser. No. 207,945, Mar. 8, 1994, Pat. No. 5,546,977.

[51] Int. Cl.⁶ .............................. G01M 3/08; F16K 43/00
[52] U.S. Cl. .......................... 137/15; 29/428; 29/890.124; 29/890.127; 73/40.5 R; 73/46; 137/312; 137/315
[58] Field of Search ...................... 137/312, 315, 137/454.2, 454.5, 515.7, 527, 527.8; 251/298; 29/890.12, 890.124, 890.127, 428

[56] References Cited

U.S. PATENT DOCUMENTS

| | | | |
|---|---|---|---|
| 1,371,632 | 3/1921 | Latimer | 285/133.1 |
| 1,383,680 | 7/1921 | Waldorf | 138/148 |
| 2,031,849 | 5/1930 | O'Leary | 285/138 |
| 2,613,166 | 10/1952 | Gronemyer | 138/147 |
| 2,969,462 | 1/1961 | Wheatley | 137/527.8 |
| 3,934,608 | 1/1976 | Guyton | 137/527.8 |
| 4,475,571 | 10/1984 | Houston, Jr. et al. | 137/315 |
| 4,508,139 | 4/1985 | Teumer | 137/315 |
| 4,606,368 | 8/1986 | McCufferty | 137/315 |
| 4,681,133 | 7/1987 | Weston | 137/315 |
| 4,744,386 | 5/1988 | Frazer | 137/315 |
| 4,867,201 | 9/1989 | Curten | 251/331 |
| 4,921,003 | 5/1990 | Horvei | 137/315 |
| 4,939,833 | 7/1990 | Thomas | 137/312 |
| 4,976,366 | 12/1990 | Russell | 137/375 |
| 5,096,087 | 3/1992 | Thomas | 137/312 |
| 5,129,417 | 7/1992 | DuPont et al. | 137/315 |
| 5,143,112 | 9/1992 | Scaramucci | 137/315 |
| 5,228,472 | 7/1993 | Ougiya et al. | 137/312 |

Primary Examiner—George L. Walton
Attorney, Agent, or Firm—Head, Johnson & Kachigian

[57] ABSTRACT

A double containment manhole fitting for use with a double containment pipe with inner carrier pipes and outer containment pipes. The fitting includes an inner T carrier housing that may be connected to the inner carrier pipes, the housing having a removable cap. An outer containment housing has a larger diameter than the height of the inner carrier housing, the outer carrier housing having a V-shaped opening. A plurality of spiders are attached to the carrier housing to concentrically position the inner carrier housing within the outer carrier housing. The branch assembly is attached to the outer containment housing V-shaped opening, the branch assembly having a removable cover to provide access to the removable cap of the carrier housing.

8 Claims, 2 Drawing Sheets

DOUBLE CONTAINMENT FITTING

CROSS REFERENCE OF APPLICATION

This application is a continuation-in-part application of U.S. patent application Ser. No. 08/207,945, filed Mar. 08, 1994, entitled DUAL CONTAINMENT VALVE SYSTEM, now U.S. Pat. No. 5,546,977.

BACKGROUND OF THE INVENTION

1. Field of the Invention

The present invention relates to a double containment manhole fitting for dual containment piping systems for fluids. In particular, the present invention relates to the dual containment manhole fitting which is an integral, one-piece unit allowing for simple and easy installation and allowing for ready accessibility to the inner carrier.

2. Prior Art

Double containment piping systems have become common in the chemical processing industries and others. A series of inner containment pipes are used to transport fluid therethrough. Concentric, outer containment pipes surround the inner containment pipes and contain and seal off any leakage from the carrier pipes. The containment pipe may also include drainage systems and leak detectors so that leaks from the carrier pipe may be attended to. In the past, when control of or access to the fluid within the inner carrier pipe was called for, a standard valve or cleanout fitting was installed in the carrier pipe line. Thereafter, a housing manhole or other box structure was constructed around the valve or cleanout fitting and around a break in the containment pipe. The structure would have a door or other access means for repair, service or control of the valve or cleanout fitting.

While this may achieve the intended purpose of leak containment, it does not comport with the leak detection systems in the containment pipe and may not be compatible with conventional hangers, anchors and pipe supports.

There exists a need for a one-piece integral dual containment manhole system which may be installed and connected to both the carrier pipes and containment pipes.

Accordingly, it is a principal object and purpose of the present invention to provide a one-piece integral dual containment manhole system for a double containment fluid system.

It is often required to be able to access the inner containment pipes which hold and transmit fluid through the double containment fluid system. A housing manhole or other box structure may be constructed around a break in the containment pipe and a port made in the carrier pipe. While these access points sometimes referred to as manhole fittings can be constructed, they do not provide a one-piece integral dual containment fitting which may be installed and connected to both carrier pipes and containment pipes.

It is, therefore, a principal object and purpose of the present invention to provide a one-piece integral dual containment manhole fitting allowing for ready access to an opening in the carrier.

SUMMARY OF THE INVENTION

The present invention provides a manhole tee fitting for a dual or double containment piping arrangement wherein a number of inner carrier pipes are arranged and connected end-to-end to transport fluids and a series of concentric outer containment pipes surround the inner carrier pipes and are concentric therewith.

An inner carrier housing in the form of a t-shape with a fluid passageway therethrough. The passageway terminates in a pair of opposed open end sockets. The inner carrier housing includes a branch in fluid communication with the fluid passageway. The carrier branch terminates in a threaded opening in which is received a threaded cap. An O-ring between the cap and the carrier housing assists in maintaining a fluid tight seal.

An outer containment housing completely surrounds the inner carrier housing. A spacer or spacers maintain the inner carrier housing concentric with the outer containment housing. The outer containment housing includes a pair of opposed ends. The outer containment housing includes a branch assembly in angular relation to the axis of passage through the containment housing. The branch assembly terminates in a flanged, open top. The flanged, open top includes a plurality of openings. A flanged lid mates with the flanged open top to seal the branch assembly and create a fluid tight seal. The flanged lid is fastened to the flanged open top by fasteners. The flanged lid includes a central, threaded opening into which a threaded plug is received. An O-ring between the threaded plug and the threaded opening assists in maintaining a fluid tight seal.

DETAILED DESCRIPTION OF THE PREFERRED EMBODIMENTS

Figure 1:
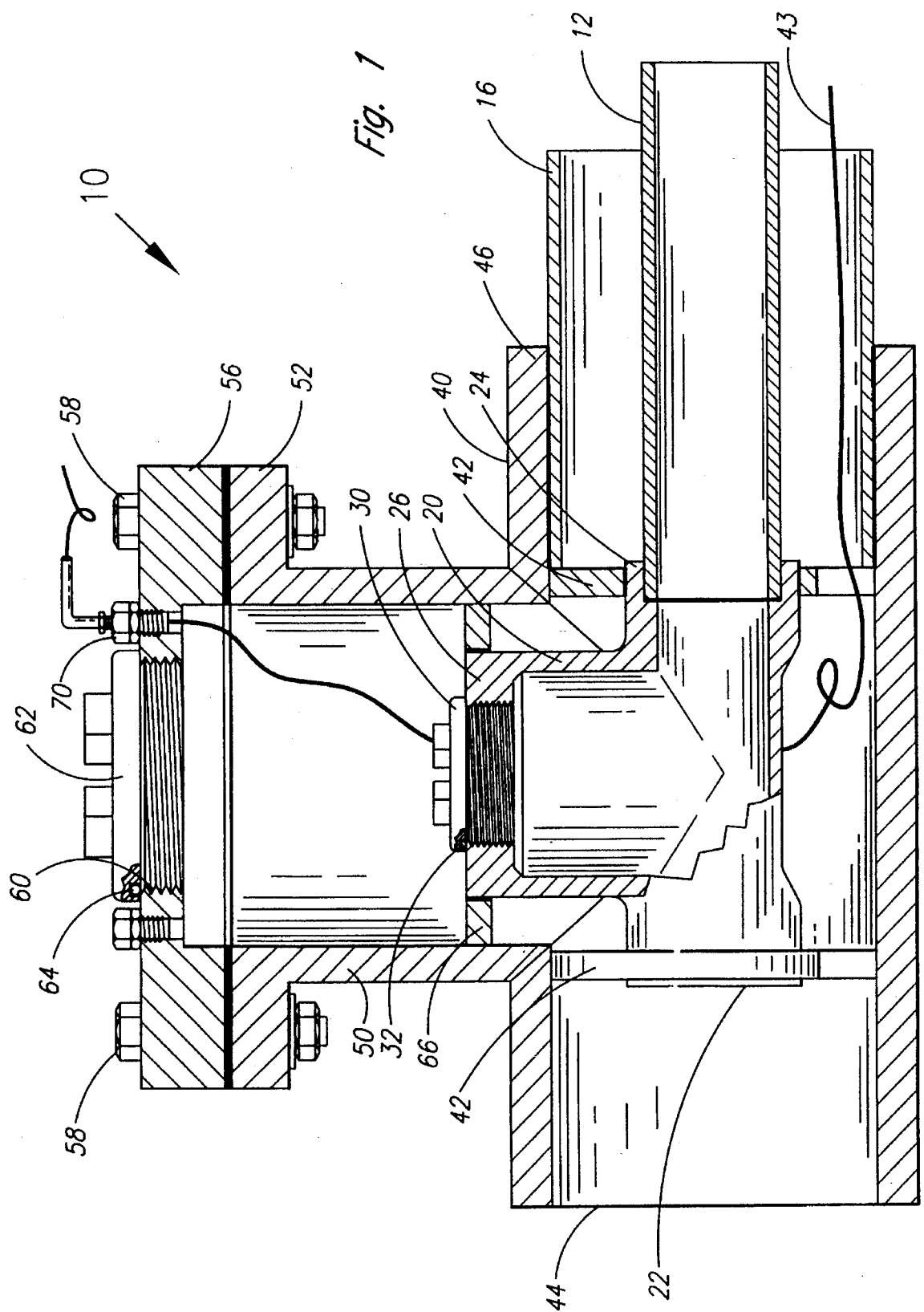
FIG. 1 is a sectional view of a double containment manhole fitting for use with double containment pipes having inner carrier pipes for fluid and outer containment pipes, the fitting constructed in accordance with the present invention.
Figure 2:
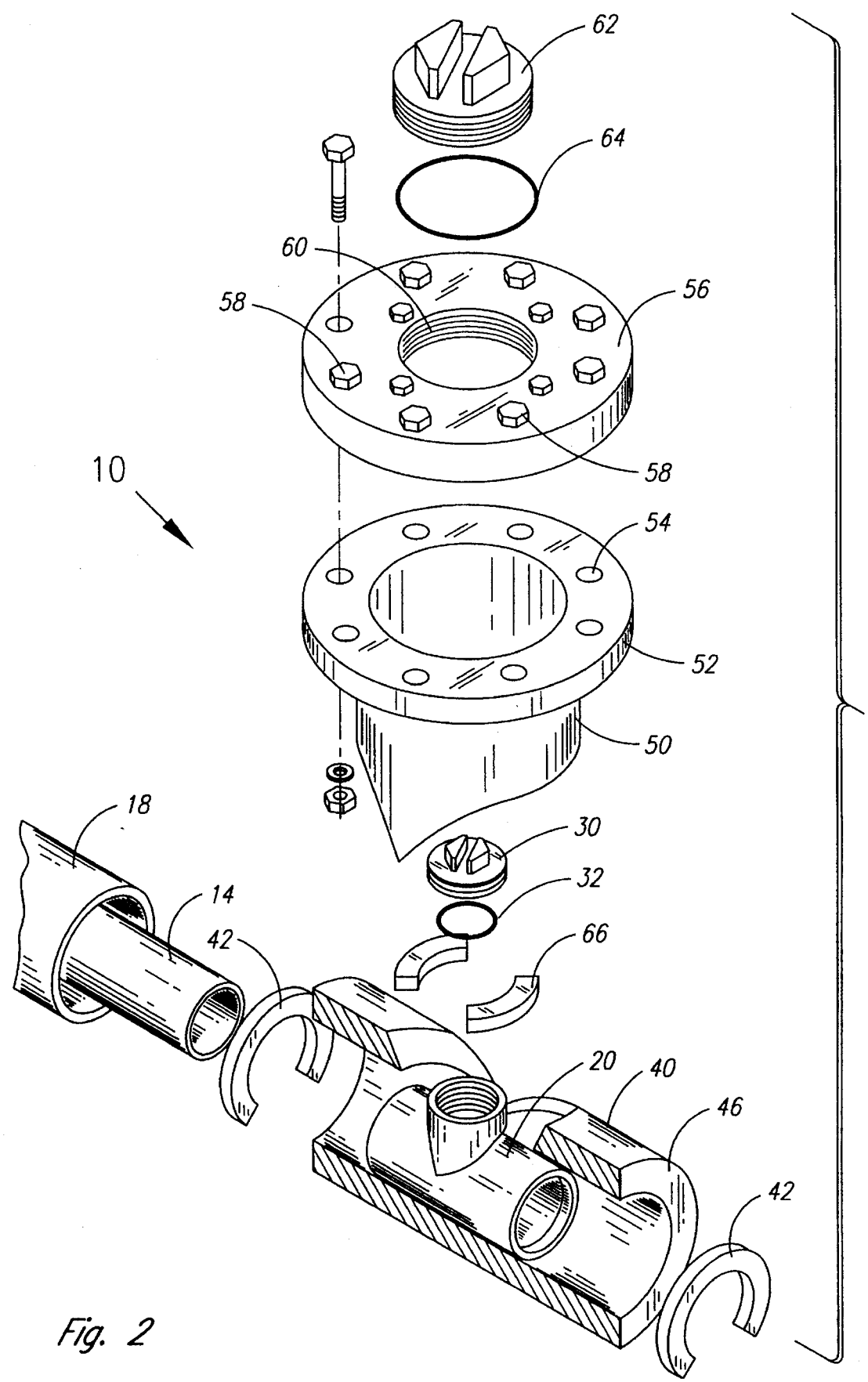
FIG. 2 is an exploded view of the double containment manhole fitting as shown in FIG. 1.

Referring to the drawings in detail, FIGS. 1 and 2 illustrate one embodiment of the present invention of a fitting for a manhole tee. FIG. 1 illustrates a sectional view of the double containment manhole fitting 10. FIG. 2 illustrates an exploded view partially in section for ease of comprehension of the fitting.

In a typical dual or double containment piping arrangement, a number of inner carrier pipes, such as 12 and 14, are arranged and connected end-to-end to transport fluids of various types therethrough. A series of concentric outer containment pipes, such as those shown at containment pipes 16 and 18, surround the inner carrier pipes and are concentric therewith. The outer containment pipes, such as 16 and 18, form a fluid tight seal around the carrier pipes. It is well known that any leakage from the inner carrier pipes will be trapped in the outer containment pipes.

Spacers (not shown) may be used to keep the pipes in concentric alignment.

In the fitting 10, an inner carrier housing 20 is in the form of a T-shape and has a fluid passageway therethrough (seen in the sectional FIG. 1). The passageway terminates in a pair of opposed open end sockets 22 and 24.

Carrier pipe 12 connects with open end socket 24 (see FIG. 1) while carrier pipe 14 would connect with open end socket 22 (see FIG. 2). The inner carrier housing 20 includes a branch 26 in fluid communication with the fluid passageway. The carrier branch 26 in the present embodiment is perpendicular to the axis of the fluid passageway. The carrier branch 26 terminates in a threaded opening to which is received a threaded cap 30. An o-ring 32 between the cap 30 and the carrier housing 20 assists in maintaining the fluid tight seal. Removal of the threaded cap allows full access, including visual access, to the fluid and to the interior of the carrier pipe.

An outer containment housing 40 completely surrounds the inner carrier housing. A spacer or spacers 42 maintain the inner carrier housing 20 concentric with the outer containment housing 40. As seen in both figures, the spacers 42 may have openings or cut away portions to allow for drainage or for leak detection cable or systems in the dual containment piping. In FIG. 1, a cable 43 may be seen which is a part of the leak detection system.

The outer containment housing 40 includes a pair of opposed open ends 44 and 46. Outer containment pipe 16 will be received within the open end 46 while the outer containment pipe 18 will be received within the open end 44. Accordingly, a fluid tight passage is provided between the outer containment pipe 18, the outer containment housing 40 of the fitting and the outer containment pipe 16.

The outer containment housing 40 includes a branch assembly 50. The branch assembly 50 is in fluid tight communication with the outer containment housing and is in angular relation to the axis of passage through the containment housing. In the embodiment shown, the branch assembly 50 is perpendicular to the axis of the passage through the containment housing. The branch assembly 50 terminates in a flanged open top 52. The flanged open top 52 includes a plurality of opening 54 (seen in FIG. 2).

A flanged lid 56 mates with the flanged open top 52 to seal the branch assembly 50 and create a fluid tight seal. The flanged lid 56 includes a plurality of openings (not visible in FIG. 1) which mate with the openings 54 and the flanged open top. Accordingly, the flanged lid 56 is fastened to the flanged open top 52 by fasteners 58. The flanged lid 56 includes a central, threaded opening 60. A threaded plug 62 is received in the threaded opening 60. An O-ring 64 between the threaded plug 62 and threaded opening 60 assists in maintaining a fluid tight seal. In order to gain access to the threaded cap 30 of the inner carrier housing and, in turn, the inner carrier housing, the threaded cap 62 may be unscrewed and removed from the flanged lid 56. Alternatively, the fasteners 58 may be removed for maintenance, repair or replacement.

The threaded cap 30 may be unthreaded from the open end. It can be seen that the threaded opening 30 is in alignment with the threaded opening 60 of the containment housing. In order to reseal the fitting 10 for use, the opposite, reverse procedure is performed.

One or more spider segments 66, in a quarter arc 66, retain the carrier branch 26 in alignment with the branch assembly 50.

One or more openings through the flanged lid 56 permit an adaptor 70 to be placed therethrough for receipt of cable or other fluid and leak detection equipment.

In order to produce and assemble a double containment manhole fitting 10 of the present invention, the inner carrier housing 20 may be initially molded on a mandril or a mold. The components may be produced from fiberglass or other corrosion resistant material. Thereafter, a larger tube or pipe will have a v-shaped opening mitered in the outer wall of the pipe. The inside diameter of the outer containment housing will have a larger diameter than the height of the inner carrier housing 20. Thereafter, the inner carrier housing will be slipped into the outer carrier housing 40. In one process, the inner carrier housing 20 will be slipped in through one of the open ends 44 or 46. The spiders 42 are thereafter attached and bonded to the outside of the inner carrier housing 20. The inner carrier housing is thereby concentrically aligned inside of the outer containment housing. A branch assembly 50 is bonded onto the outer containment housing at the v-shaped opening. The flanged open top is bonded or otherwise secured to the branch assembly. The flanged lid may thereafter be connected to the branch assembly. The fitting may be composed of any corrosion-resistant material, such as a filament wound thermal setting resin.

Whereas, the present invention has been described in relation to the drawings attached hereto, it should be understood that other and further modifications, apart from those shown or suggested herein, may be made within the spirit and scope of this invention.

What is claimed:

1. A method to produce a double containment manhole fitting for use with a double containment pipe having inner carrier pipes for fluid and outer containment pipes, which method comprises:

molding an inner T carrier housing on a mold;

mitering a V-shaped opening in an outer containment housing having a larger diameter than the height of said inner carrier housing;

slipping said inner carrier housing into said outer containment housing;

attaching a plurality of spiders to said inner carrier housing to concentrically space said inner carrier housing in said outer containment housing;

attaching a branch assembly onto said outer containment housing at said V-shaped opening; and attaching a removable cover to said branch assembly.

2. A method to produce a double containment fitting as set forth in claim 1 including the additional step of adding a threaded insert to an opening in said branch assembly cover.

3. A method to produce a double containment fitting as set forth in claim 2 including the additional step of providing at least one opening in said branch assembly cover for sensing equipment.

4. A method to produce a double containment fitting as set forth in claim 1 including the additional step of adding a threaded opening to said inner carrier housing to receive a removable threaded cap.

5. A double containment manhole fitting for use with a double containment pipe having inner carrier pipes for fluid and outer containment pipes, which fitting comprises:

an inner T carrier housing having means to connect said inner carrier pipes thereto and a removable cap;

an outer containment housing having a larger diameter than the height of said inner carrier housing, said outer carrier housing having a V-shaped opening;

a plurality of spiders attached to said carrier housing to concentrically position said inner carrier housing in said outer containment housing; and a branch assembly attached to said outer containment housing at said V-shaped opening, said branch assembly having a removable cover to provide access to said removable cap of said carrier housing.

6. A double containment fitting as set forth in claim 5 wherein each said spider has at least one opening or of an opening and recess for leak detection equipment.

7. A double containment fitting as set forth in claim 5 wherein said branch assembly removable cover includes a flanged lid having a threaded opening and a threaded plug.

8. A double containment fitting as set forth in claim 7 including at least one threaded plug for passage of sensing equipment.

* * * * *

UNITED STATES PATENT AND TRADEMARK OFFICE
CERTIFICATE OF CORRECTION

PATENT NO. : 5,615,700
DATED : April 1, 1997
INVENTOR(S) : David A. Chaney, et. al.

It is certified that error appears in the above-indentified patent and that said Letters Patent is hereby corrected as shown below:

Column 4, line 58 (claim 6), delete "opening or".

Signed and Sealed this

First Day of July, 1997

Attest:

BRUCE LEHMAN

Attesting Officer

Commissioner of Patents and Trademarks